UNITED STATES PATENT OFFICE.

MAX ENGELMANN AND BENEDIKT MERKEL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PRODUCTION OF CYANAMID.

1,102,892.

Specification of Letters Patent.

Patented July 7, 1914.

No Drawing.

Application filed February 27, 1912. Serial No. 680,342.

*To all whom it may concern:*

Be it known that we, MAX ENGELMANN and BENEDIKT MERKEL, doctors of philosophy, chemists, citizens of the German Empire, residing at Elberfeld, Germany, have invented new and useful Improvements in the Production of Cyanamid, of which the following is a specification.

Our invention relates to an improvement in and relating to the isolation of cyanamid from the crude product which is produced by the action of nitrogen upon carbid. This crude product consists of calcium cyanamid, carbon, dicyandiamid and calcium carbid. Our new process for the isolation of cyanamid free from impurities and with a good yield from this mixture consists in separating the cyanamid in the shape of its lead compound.

In order to illustrate the new process more fully the following example is given:—100 kilos of the crude product obtained from carbid and nitrogen are slowly introduced into 450 liters of a 20 per cent. sulfuric acid mixed with 300 kilos of ice. When the reaction is complete calcium sulfate and carbon are filtered off. To the filtered liquid which should be slightly acid 100 liters of a 20 per cent. ammonia solution and 180 kilos of $PbCl_2$ (aqueous paste) are added and the lead compound of cyanamid is filtered off.

Other lead salts e. g. lead sulfate, lead sulfid, etc., and instead of ammonia other alkaline agents can be used.

We claim:—

1. The process of isolating cyanamid from the reaction product of nitrogen upon calcium carbid which comprises treating the reaction product with an acid which forms an insoluble calcium compound, removing such compound, and precipitating the cyanamid from the resulting solution by treatment with a lead compound soluble in alkali solutions in the presence of such alkali.

2. The process of isolating cyanamid from the reaction product of nitrogen upon calcium carbid which comprises treating such reaction product with sulfuric acid, filtering, and precipitating the cyanamid from the resulting filtrate in the form of its lead compound, by treatment with a lead compound soluble in alkali solutions in the presence of such alkali.

3. The process of isolating cyanamid from the reaction product of nitrogen upon calcium carbid which comprises treating such reaction product with sulfuric acid, filtering, and precipitating the cyanamid from the resulting filtrate in the form of its lead compound by treatment with a lead salt soluble in ammoniacal solutions in the presence of such solutions.

4. The process of isolating cyanamid from the reaction product of nitrogen upon calcium carbid which comprises treating the reaction product with an acid capable of setting free the cyanamid and precipitating the cyanamid from the resulting solution by treatment with a lead compound soluble in alkali solutions in the presence of such alkali.

In testimony whereof we have hereunto set our hands in the presence of two subscribing witnesses.

MAX ENGELMANN. [L. S.]
BENEDIKT MERKEL. [L. S.]

Witnesses:
HELEN NUFER,
ALBERT NUFER.